Patented Feb. 16, 1932

1,844,963

UNITED STATES PATENT OFFICE

ALFRED T. LARSON, OF WILMINGTON, DELAWARE, ASSIGNOR TO E. I. DU PONT DE NEMOURS & COMPANY, OF WILMINGTON, DELAWARE, A CORPORATION OF DELAWARE

AMMONIA SYNTHESIS PROCESS

No Drawing. Original application filed March 29, 1927, Serial No. 179,398, now Patent No. 1,771,130, dated July 22, 1930. Divided and this application filed March 10, 1928. Serial No. 260,813.

This invention relates to a catalytic process for the synthesis of ammonia, and particularly to improved catalytic agents for use therein.

This application is a division of application Serial No. 179,398, filed March 29, 1927, which issued as Patent No. 1,771,130, dated July 22, 1930.

It is well known that iron will accelerate the reaction whereby ammonia is formed directly from its elements. None of the known forms of pure iron is capable, however, of maintaining a high catalytic activity for any appreciable length of time.

It is also known that certain substances, admixed with the iron, greatly modify its catalytic power or effect. Some of these substances are known to greatly interfere with the catalytic properties of iron; in fact, some of them effectively destroy its catalytic properties. These are usually referred to as "poisons" and may include such elements as sulphur, selenium, tellurium, phosphorus, arsenic, antimony, bismuth, lead, tin, and the halogens and compounds of these elements.

Furthermore, it is known that there are certain substances whose presence in the nitrogen-hydrogen mixture employed in the synthesis of ammonia will deleteriously affect the catalyst, but not permanently. That is to say, substantially the original activity of the catalyst will return if the gases containing poisoning ingredients are replaced by pure gases. Oxygen and certain of its compounds, such as carbon monoxide, carbon dioxide and water, are typical examples of this class of poisons. To distinguish these from the poisons which, like sulphur, permanently decrease the activity of the catalyst, the latter are referred to as permanent poisons.

It has been proposed, on the other hand, to increase the catalytic activity of iron and maintain it in an active condition for somewhat longer periods of time by adding thereto certain substances which have been designated as "promoters". For example, the oxides of many of the metals have been suggested as promoters of iron catalysts. My experiments have shown, however, that very few of these oxides when added singly to pure iron, lead to any practical advantage, but I have discovered that the addition of two or more such oxides to iron catalysts produces a marked improvement in the activity thereof.

In my co-pending application Serial No. 47,140, filed August 30th, 1925, I have shown that although potassium oxide and magnesium oxide when employed separately do not satisfactorily promote an iron catalyst, by suitably adding to the iron both potassium oxide and magnesium oxide, a catalyst of excellent activity is obtained. My experiments have demonstrated, for example, that such a catalyst will give 25 to 30% ammonia at 500° C. and 900 atmospheres, whereas under the same conditions catalysts to which potassium oxide or magnesium oxide have been added as single promoter constituents give only 3% and 6% of ammonia respectively.

It is the object of the present invention to effect a further improvement in the synthesis of ammonia by providing catalysts of even higher initial activity and capable of retaining their activity over a longer period of time than those described in the above-mentioned co-pending application.

Other objects and advantages will be apparent as the invention is better understood by reference to the following specification in which its preferred embodiments are described.

I have discovered that improved results in ammonia synthesis may be obtained by employing a catalyst comprising iron promoted with suitable proportions of potassium oxide and magnesium oxide with a third promoting constituent consisting of an oxide of one of the elements chromium, titanium, silicon, vanadium, lanthanum, tantalum, molybdenum, aluminum, tungsten, uranium, zirconium, manganese and boron. Catalysts of this type are not only more active for the synthesis of ammonia than iron alone but also are characterized by a higher initial activity than is exhibited by those consisting only of iron, potassium oxide and magnesium oxide, and I have found, moreover, that they maintain their activity under normal operating conditions for considerably greater periods of time. For example, I have observed that a catalyst consisting of iron with one mole per cent. of potassium oxide, 20 mole per cent. of magnesium oxide, and one mole per cent. of silicon dioxide will give 25 to 40% ammonia at 500° C. and 900 atmospheres, and that with pure gases and properly controlled operating conditions this activity is maintained for a long time. (The mole per cent. is based on the total weight of catalyst; i. e., 20 mole per cent. of magnesia is equivalent to 20 molecular weights of magnesia with 80 molecular weights of other ingredients.)

In preparing my improved catalyst the mixed promoters above described may be used in varying proportions as regards both the ratio of promoter constituents one to the other and the ratio of total promoter content to the iron employed. In general, excellent results can be obtained with an iron catalyst containing 0.25 to 2 mole per cent. of potassium oxide, 20 to 40 mole per cent. of magnesium oxide, and 0.5 to 5 mole per cent. of the third promoting constituent. Also, if desired, a mixture of two or more of the oxides of the above-named elements may be used in conjunction with potassium and magnesium oxides. The catalysts may be prepared in any convenient way, as for instance by fusion of the oxides, by ignition of mixtures of their salts, or by co-precipitation of two or more of the oxides.

For the best results the usual precautions with respect to the exclusion of contact poisons should be observed in both the preparation and use of the catalyst.

The following examples will serve to illustrate the preferred procedure in carrying out the invention, it being understood, however, that the invention is not limited to the details of the operation as herein described.

*Example 1.*—Add approximately one molecular weight of pure potassium carbonate, 20 molecular weights of pure magnesium oxide, and one molecular weight of pure chromic oxide to 78 molecular weights of pure ferroso-ferric oxide. Melt the oxide mixture, thoroughly stir the molten mass, allow to cool, crush and screen to suitable size. Place the screened material in a reaction tube adapted for the purpose and treat the oxide mixture at atmospheric pressure with pure hydrogen, free from such permanent catalyst poisons as sulphur, or with the nitrogen-hydrogen mixture employed in the synthesis. The reduction is started at about 400° C. The temperature is gradually increased until that temperature is reached at which it is proposed to conduct the synthesis reaction. (For most purposes the temperature of reduction of the oxide mixture is preferably maintained between 300°–600° C.). When a nitrogen-hydrogen gas mixture under 900 atmospheres pressure and free from catalyst poisons, particularly sulphur and oxygen, is passed over this reduced material at 550–600° C., practical yields of ammonia are obtained.

*Example 2.*—An iron-potassium-magnesium-chromium catalyst can also be prepared as follows:—Dissolve 50 grams of magnesium nitrate crystals and 300 grams of ferric nitrate crystals in about 3 liters of water. Add slowly with constant stirring a 10% (by weight) solution of ammonia until no more precipitate forms. Wash the precipitate substantially free from nitrate by decantation, filter, place the moist filter cake in a kneading machine and add 3 grams of finely powdered potassium dichromate. Intimately mix the dichromate with the moist filter cake. Again filter. Break the filter cake into lumps measuring about one inch on a side and dry slowly at about 125° C. Crush the dried mixture into fragments of suitable size and reduce as in Example 1.

*Example 3.*—For the catalyst described in Example 1 there may be substituted a catalyst prepared in the same way but employing the following materials: 77 molecular weights of ferroso-ferric oxide, one molecular weight of potassium carbonate, 20 molecular weights of magnesium oxide and two molecular weights of aluminum oxide.

*Example 4.*—The material specified in Example 1 may be replaced by 68 molecular weights of ferroso-ferric oxide, one molecular weight of potassium carbonate, thirty molecular weights of magnesium oxide and one molecular weight of zirconium oxide.

*Example 5.*—An iron-potassium-magnesium-silicon catalyst may be prepared by substituting the following materials for those specified in Example 1:—68 molecular weights of ferroso-ferric oxide, 1 molecular weight of potassium carbonate, 20 molecular weights of magnesium oxide and 1 molecular weight of silicon dioxide.

The materials employed in preparing the catalysts may be either the oxides themselves, the metals or elements, or compounds of these metals or elements which may be converted to suitable form for the catalyst. In the selection of the materials, it is recommended that only such be used as are free from catalyst poisons in order that the best results may be obtained.

The catalysts as described may be utilized in ammonia synthesis by placing the catalyst in a suitable receptacle having sufficient strength to withstand the pressure employed and passing a mixture of nitrogen and hydrogen in substantially the ratio of 1:3 and at a suitable pressure through the catalyst while the catalyst is maintained at a suitable temperature. The effectiveness of the catalyst is not limited to any specific pressure or temperature range. It can be used advantageously in processes in which the gases are introduced to the catalyst at pressures between 400 and 2000 atmospheres and at temperatures between 400° and 700° C. It is to be understood that the gaseous mixture can be heated prior to its contact with the catalyst by heat exchange with outgoing reaction products or otherwise and that suitable heat exchangers may be provided for the purpose. Likewise, precautions should be observed to avoid overheating of the catalyst. The gaseous mixture employed should be free from catalyst poisons and may be purified in any suitable manner prior to its introduction to the catalyst.

While the invention is not to be limited by any explanation or theory as to the improved activity of the catalysts herein described, my experiments indicate that the beneficial results effected by the addition of one of the elements hereinbefore named to an iron-potassium-magnesium catalyst may be due not to any actual promoting effect of the element upon the iron itself but to the ability of the element to more firmly establish and maintain the intermolecular relationship between potassium and magnesium on the one hand and iron on the other, which is responsible for the improved activity of an iron-potassium-magnesium catalyst as disclosed in my copending application above referred to. Although my catalysts have been described as mixtures of iron, alkali metal oxide, and alkaline earth metal oxide with a third promoting constituent, it is possible that when in use they actually contain iron, alkali metal and alkaline earth metal in elemental form, either with or without some modicum of oxides thereof. I have observed that with a catalyst formed by the reduction of iron and alkali metal oxide, continued use seems to result in a gradual loss of the alkali metal, possibly due to a reduction of the alkali metal oxide and a gradual volatilization of the element. It may be that one of the functions of the third promoter constituent of my catalysts is to prevent this loss of alkali metal. It may also be that the process of making the catalyst results in the formation of a more or less complex compound of the elements or oxides or both, which on subsequent reduction forms other compounds or mixtures. In any event, it is to be understood that the term catalyst as employed in the claims includes the contact mass as prepared originally as well as in any modified form in which it may occur during its use.

It will be apparent from the foregoing that the present invention provides ammonia synthesis catalysts of improved activity and longer life, and thereby makes possible higher commercial yields and reduces the need for catalyst replacement.

Various changes may be made in the details of the method hereinbefore described without departing from the invention or sacrificing any of the advantages thereof.

I claim:

1. A catalyst active for the synthesis of ammonia from its elements comprising iron, potassium oxide, magnesium oxide and silicon oxide, said catalyst being more active in the synthesis of ammonia than iron alone.

2. A catalyst active for the synthesis of ammonia from its elements comprising the reduction product of a fused mixture of iron oxide, potassium oxide, magnesium oxide and silicon oxide, said catalyst being more active in the synthesis of ammonia than iron alone.

3. An iron catalyst, active for the synthesis of ammonia from its elements and containing 0.25 to 2 mole per cent of potassium, 20 to 40 mole per cent of magnesium and 0.5 to 5 mole per cent of silicon.

4. An iron catalyst active for the synthesis of ammonia from its elements and containing about one mole per cent of potassium, about 20 mole per cent of magnesium and about one molecular weight of silicon, said catalyst being more active in the synthesis of ammonia than iron alone.

5. A process for the synthesis of ammonia which comprises passing a mixture of nitrogen and hydrogen over a catalyst containing iron, potassium oxide, magnesium oxide and silicon oxide, said catalyst being more active in the synthesis of ammonia than iron alone.

6. A catalyst active for the synthesis of ammonia from its elements, comprising iron, potassium oxide and compounds of magnesium and silicon.

7. A process for the synthesis of ammonia which comprises passing a mixture of nitrogen and hydrogen over a catalyst comprising iron, potassium oxide and compounds of magnesium and silicon.

In testimony whereof I affix my signature.

ALFRED T. LARSON.

CERTIFICATE OF CORRECTION.

Patent No. 1,844,963.  Granted February 16, 1932, to

ALFRED T. LARSON.

It is hereby certified that error appears in the printed specification of the above numbered patent requiring correction as follows: Page 3, line 87, claim 4, for the words "molecular weight" read mole per cent, and lines 87 to 89, of same claim, strike out the comma and words ", said catalyst being more active in the synthesis of ammonia than iron alone"; and that the said Letters Patent should be read with these correction therein that the same may conform to the record of the case in the Patent Office.

Signed and sealed this 22nd day of March, A. D. 1932.

M. J. Moore,
Acting Commissioner of Patents.

(Seal)